US010025419B2

(12) United States Patent
Seo et al.

(10) Patent No.: US 10,025,419 B2
(45) Date of Patent: Jul. 17, 2018

(54) LARGE FORMAT DISPLAY APPARATUS AND CONTROL METHOD THEREOF

(71) Applicant: SAMSUNG ELECTRONICS CO., LTD., Suwon-si (KR)

(72) Inventors: Ju-hee Seo, Suwon-si (KR); Hye-sun Kim, Yongin-si (KR); Moon-sik Jeong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 15/018,275

(22) Filed: Feb. 8, 2016

(65) Prior Publication Data
US 2017/0060319 A1    Mar. 2, 2017

(30) Foreign Application Priority Data

Sep. 2, 2015  (KR) .................. 10-2015-0124506

(51) Int. Cl.
| G06F 3/041 | (2006.01) |
| G06F 3/01 | (2006.01) |
| G06F 3/0481 | (2013.01) |
| G09G 5/38 | (2006.01) |
| G06F 3/0488 | (2013.01) |

(52) U.S. Cl.
CPC ............ *G06F 3/0416* (2013.01); *G06F 3/011* (2013.01); *G06F 3/0481* (2013.01); *G06F 3/04883* (2013.01); *G09G 5/38* (2013.01)

(58) Field of Classification Search
CPC .......................... G06F 3/011; H04N 21/44218
See application file for complete search history.

(56) References Cited

U.S. PATENT DOCUMENTS

| 7,489,297 | B2 | 2/2009 | Hohmann et al. |
| 7,730,418 | B2 | 6/2010 | Wang et al. |
| 2006/0158425 | A1* | 7/2006 | Andrews ........... H04N 5/74 345/156 |
| 2009/0070670 | A1 | 3/2009 | Kishi |
| 2011/0148926 | A1 | 6/2011 | Koo et al. |
| 2011/0254846 | A1 | 10/2011 | Lee et al. |
| 2011/0283227 | A1 | 11/2011 | Moore et al. |

(Continued)

FOREIGN PATENT DOCUMENTS

| JP | 9-282534 A | 10/1997 |
| JP | 2001-117684 A | 4/2001 |

(Continued)

OTHER PUBLICATIONS

International Search Report dated Jul. 20, 2016 issued by the International Searching Authority in counterpart International Application No. PCT/KR2016/002705 (PCT/ISA/210).

(Continued)

*Primary Examiner* — Jeffery A Brier
(74) *Attorney, Agent, or Firm* — Sughrue Mion, PLLC

(57) ABSTRACT

A large format display (LFD) apparatus is provided. The LFD apparatus includes a display configured to display a content comprising at least one content element, a sensor configured to detect at least one user, and a processor configured to estimate a height of the at least one user detected by the sensor, and change a display location of the at least one content element on a screen of the display based on the estimated height.

15 Claims, 15 Drawing Sheets

(56) References Cited

U.S. PATENT DOCUMENTS

| | | | |
|---|---|---|---|
| 2012/0220338 A1 | 8/2012 | Degrazia et al. | |
| 2013/0159565 A1 | 6/2013 | Soyannwo et al. | |
| 2013/0201105 A1* | 8/2013 | Ptucha | G06F 3/017 |
| | | | 345/158 |
| 2014/0192089 A1 | 7/2014 | Honda et al. | |
| 2014/0225931 A1 | 8/2014 | Plagemann et al. | |
| 2014/0313277 A1* | 10/2014 | Yarosh | H04N 7/15 |
| | | | 348/14.08 |
| 2015/0062048 A1* | 3/2015 | Park | G06F 3/1423 |
| | | | 345/173 |

FOREIGN PATENT DOCUMENTS

| | | |
|---|---|---|
| JP | 2005-327262 A | 11/2005 |
| JP | 2009-87026 A | 4/2009 |
| JP | 2010-66915 A | 3/2010 |
| JP | 2014-134613 A | 7/2014 |
| KR | 10-2011-0057921 A | 6/2011 |
| KR | 10-2011-0090158 A | 8/2011 |
| WO | 2015042160 A2 | 3/2015 |

OTHER PUBLICATIONS

Written Opinion dated Jul. 20, 2016 issued by the International Searching Authority in counterpart International Application No. PCT/KR2016/002705 (PCT/ISA/237).

Communication dated May 25, 2018, issued by the European Patent Office in counterpart European Application No. 16842066.9.

* cited by examiner

LARGE FORMAT DISPLAY APPARATUS AND CONTROL METHOD THEREOF

CROSS-REFERENCE TO RELATED APPLICATION

This application claims priority from Korean Patent Application No. 10-2015-0124506, filed on Sep. 2, 2015 in the Korean Intellectual Property Office, the disclosure of which is incorporated herein by reference in its entirety.

BACKGROUND

Field

Apparatuses and methods consistent with exemplary embodiments relate to a display apparatus and a control method thereof, and more particularly, to a large format display (LFD) apparatus which provides a variety of information and a user interaction using a large display, and a control method thereof.

Description of the Related Art

Due to the development of electronic technology, various kinds of electronic products are developing and are being widely used, and electronic devices provided with various information providing functions are being used. Furthermore, the electronic devices used only in indoor spaces are installed and use outdoors.

Among these electronic devices, an LFD apparatus is a commercial large size display which is installed and operated for the purpose of promoting products and delivering information. The LFD apparatuses may be a standalone apparatus including a single panel, or a video wall which has a plurality of panels connected with one another. The LFD apparatus may be installed in a lobby of a company to promote brands and business of the company, or may be used for various other purposes such as an interior of a store, a menu board, etc. In recent years, however, as the LFD apparatus is increasingly used, various problems arise.

FIG. 1 is a view to illustrate a problem of a related-art method.

As shown in FIG. 1, the LFD apparatus has a large screen, so users may have difficulty in viewing the entire screen of the LFD apparatus at a glance unlike a TV or a mobile device. For example, a short person, e.g., a little kid, may have a problem in viewing all of the contents displayed on the LFD apparatus as shown in FIG. 1.

In addition, an area which provides the most comfortable view to a user and an area where a user can easily touch the screen may vary according to a user's physical condition. For example, user's convenience may depend on whether the user is an adult or a kid.

This problem of the related-art method arises from the contents being fixedly displayed on the LFD apparatus. Therefore, there is a need for a method for changing a content display.

SUMMARY

Exemplary embodiments may overcome the above disadvantages and other disadvantages not described above. However, the exemplary embodiments are not required to overcome the disadvantages described above, and an exemplary embodiment may not overcome any of the problems described above.

One or more exemplary embodiments provide an LFD apparatus which changes a display location of a content element included in a content displayed on the LFD apparatus according to a user who uses the LFD apparatus, and displays the content, and a control method thereof.

According to an aspect of an exemplary embodiment, there is provided a display apparatus including: a display configured to display a content including at least one content element; a sensor configured to detect at least one user; and a processor configured to estimate a height of the at least one user based on information collected by the sensor, and change a display location of the at least one content element on a screen of the display based on the estimated height.

The sensor may include at least one camera, and the processor may be configured to estimate the height of the at least one user based on at least one image of the at least one user, the at least one image being photographed by the at least one camera.

The processor may be configured to determine a field of view of the at least one user based on the estimated height and divide the screen into a plurality of display areas for displaying the at least one content element according to the field of view of the at least one user in response to the at least one user being detected.

The content may include a plurality of content elements, and the processor may be configured to display the plurality of content elements on the plurality of display areas based on a priority order of the plurality of content elements.

The processor may be configured to activate a touch recognition function on a first display area of the screen and inactivate the touch recognition function on a second display area of the screen, based on the estimated height.

The processor may be configured to display on the first display area of the screen a content element which requires a touch input.

The processor may be configured to determine a priority order of the at least one content element based on a type of the content, and change a display location of the at least one content element based on the estimated height and the priority order.

The processor may be configured to change at least one of the content and the at least one content element based on the estimated height.

The processor may be configured to estimate at least one of a location of the at least one user's face and the user's age based on the estimated height, and change the display location of the at least one content element on the screen based on at least one of the location of the at least one user's face and the at least one user's age.

The processor may be configured to, in response to a plurality of users being detected using the sensor, change the display location of the at least one content element based on at least one of a height of a user who is located closest to the LFD apparatus among the plurality of users and average height of the plurality of users.

According to an aspect of another exemplary embodiment, there is provided a control method of a display apparatus, the method including: displaying a content including at least one content element; detecting at least one user using a sensor; estimating a height of the at least one user based on information collected by the sensor; and changing a display location of the at least one content element on a screen of the LFD apparatus based on the estimated height.

The estimating may include estimating the height of the at least one user based on at least one image of the at least one user, the at least one image being photographed by a camera.

The control method may further include, determining a field of view of the at least one user based on the estimated height; and dividing the screen into a plurality of display areas for displaying the at least one content element according to the field of view of the at least one user in response to the at least one user being detected.

The content may include a plurality of content elements, and the changing may include displaying the plurality of content elements on the plurality of display areas based on a priority order of the plurality of content elements.

The control method may further include: activating a touch recognition function on a first display area of the screen and inactivating the touch recognition function on a second display area of the screen, based on the estimated height.

The changing may include displaying display on the first display area of the screen a content element which requires a touch input.

The control method may further include determining a priority order of the at least one content element based on a type of the content, and the changing may include changing a display location of the at least one content element based on the estimated height and the priority order.

The changing may include changing at least one of the content and the at least one content element based on the estimated height.

The changing may include estimating at least one of a location of the at least one user's face and the user's age based on the estimated height, and changing the display location of the at least one content element on the screen based on at least one of the location of the at least one user's face and the at least one user's age.

The changing may include, in response to a plurality of users being detected, changing the display location of the at least one content element based on at least one of a height of a user who is closest to the display apparatus among the plurality of users and average height of the plurality of users.

The processor may be configured to determine a size of one of the display areas to fully fit in the field of view of the at least one user.

The processor may be configured to determine the one of the display areas based on a predetermined priority order of the at least one content element.

The processor may be configured to estimate an age of the at least one user based on the estimated height and determine the priority order of the at least one content element based on the type of the content and the estimated age.

The processor may be configured to estimate an age of the at least one user based on the estimated height, and determine the at least one of the content and the at least one content element based on the estimated height and the estimated age.

BRIEF DESCRIPTION OF THE DRAWINGS

The above and/or other aspects will be more apparent by describing certain exemplary embodiments with reference to the accompanying drawings, in which.

DETAILED DESCRIPTION

The exemplary embodiments of the present disclosure may be diversely modified to implement an inventive concept disclosed herein. Accordingly, it should be understood that the inventive concept is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Certain exemplary embodiments will now be described in greater detail with reference to the accompanying drawings.

Figure 1:
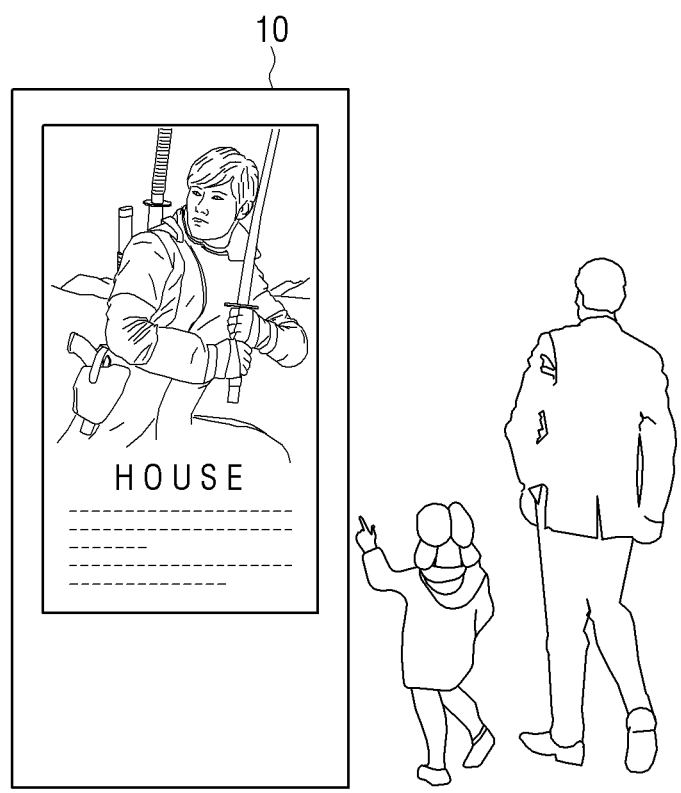
FIG. 1 illustrate a problem of a related-art method.
Figure 2A:
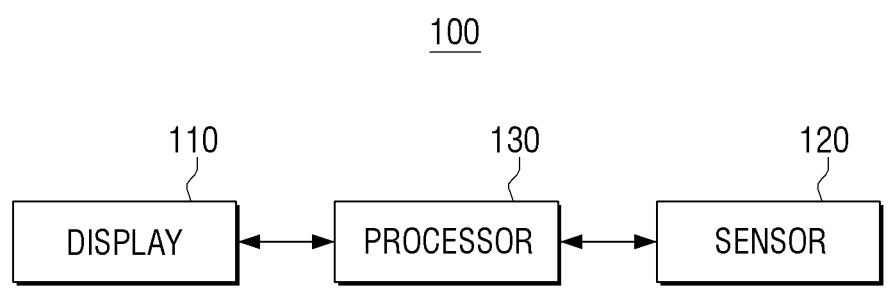
FIGS. 2A and 2B are block diagrams showing a configuration of an LFD apparatus according to an exemplary embodiment.
Figure 2B:
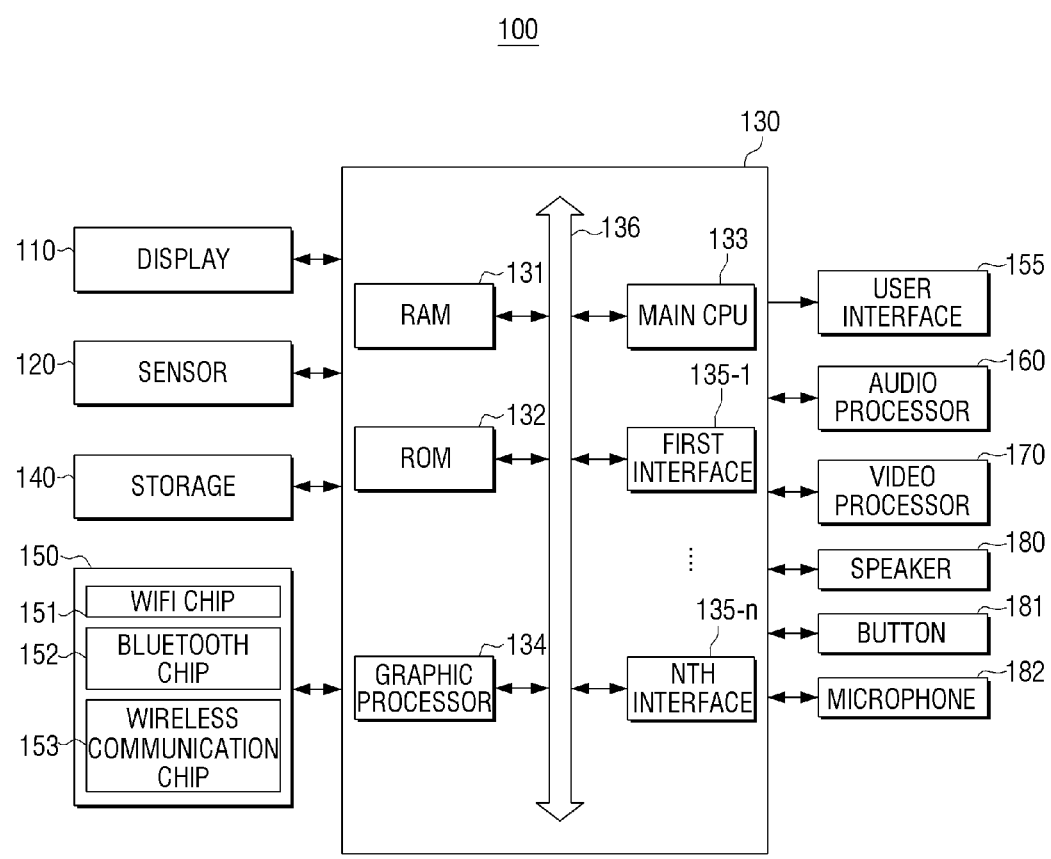

FIGS. 2A and 2B are block diagrams showing a configuration of an LFD apparatus 100 according to an exemplary embodiment.

Referring to FIG. 2A, the LFD apparatus 100 may include a display 110, a sensor 120, and a processor 130.

The LFD apparatus 100 may provide various functions which are not explicitly shown in FIG. 2A, such as a display function, a sensing function, a control function, etc. Therefore, in an exemplary embodiment, some of the elements shown in FIG. 2A may be omitted or changed, and elements not shown in FIG. 2A may further be added.

The display 110 may display a content under control of the processor 130. The content may include, but is not limited to, a moving image, a photo, a broadcast image, news, an advertisement, etc.

The display 110 may display a content including at least one content element under control of the processor 130. Herein, the content element is information included in the contend and may be used for identifying the content. For example, if the content is a movie, the content element may be an image and subtitles which are included in the movie. If the content is an advertisement, the content element may be an image and an advertising phrase which are included in the advertisement. The display 110 may display multiple contents and each of the plurality of contents may include one or more content elements.

The display 110 may be implemented using, for example, a Liquid Crystal Display (LCD) panel, Organic Light Emitting Diodes (OLEDs), etc. However, this should not be considered as limiting and the display 110 may be implemented using other types of display, such as a flexible display, a transparent display, etc. according to an exemplary embodiment.

The sensor 120 may detect a user located in front of the LFD apparatus 100. Herein, the sensor 120 may be implemented using, for example, a camera, an infrared sensor, etc. The camera may be configured to photograph a still image or a moving image. In particular, the camera may photograph the user located in front of the LFD apparatus 100.

In an exemplary embodiment, the sensor 120 may include a plurality of infrared sensors. The plurality of infrared sensors may be arranged along the edge of the LFD apparatus 100 in a line. The plurality of infrared sensors may determine an approximate height of the user located in front of the LFD apparatus 100 according to the presence/absence of reflected waves.

The above-described examples should not be considered as limiting the sensor 120. For example, the sensor 120 may be implemented using other types of sensor, such as an ultrasonic sensor, a depth map, etc.

The processor 130 may acquire information sensed from the user from the sensor 120, estimate a user's height and generate user's height information indicating the estimated user's height. In other words, the processor 130 may estimate the user's height information. Then, the processor may change the display location of at least one content element on a screen of the display 110 based on the height information. For example, the processor 130 may determine a user's field of view based on the user's height information and display an important content element to fit in the user's field of view.

Also, the processor 130 may change and display one or more content elements on account of ease of user's manipulation.

For example, if the sensor 120 includes a camera, the processor 130 may generate or acquire the user's height information based on a user image photographed by the camera. As aforementioned, the sensor 120 may include other types of sensor such as an infrared sensor, etc. The processor 130 may divide the screen of the display 110 into a plurality of display areas according to the user's field of view based on the height information.

Assuming that the content displayed on the screen includes a first content element and a second content element, and the processor 130 may display the first content element and the second content element on corresponding display areas of the plurality of display areas based on a priority order of the first and second content elements.

The processor 130 may divide the screen of the display 110 into a plurality of display areas for ease of user's touch manipulation based on the user's height information.

For example, the processor 130 may display a content element which requires a user's touch input on at least one of the plurality of display areas which enables a user to easily make a touch input on the screen, based on the user's height information.

In addition, the processor 130 may determine a priority order of the content elements based on information on the content, e.g., a type of content, and change the display location of one or more content elements based on the user's height information and the priority order.

In addition, the processor 130 may change a content or/and a display form of at least one content element based on the user's height information.

In addition, the processor 130 may estimate at least one of a location of a user's face and a user's age based on the height information, and change the display location of at least one content element based on at least one piece of the estimated information. For example, if a user is smaller than a predetermined height, the user may be determined to be a child. A size of the user's face may be also considered to estimate the user's age.

In addition, when a plurality of users are detected through the sensor 120, the processor 130 may change the display location of at least one content element based on height information of a user who is closest to the LFD apparatus 100 from among the plurality of users, or/and average height information of the plurality of users.

FIG. 2B is a block diagram showing a detailed configuration of an LFD apparatus 100, according to an exemplary embodiment. Referring to FIG. 2B, the LFD apparatus 100 may include a display 110, a sensor 120, a processor 130, a storage 140, a communicator 150, a user interface 155, an audio processor 160, a video processor 170, a speaker 180, a button 181, and a microphone 182. Among the elements shown in FIG. 2B, the same elements as in FIG. 2A will not be repeatedly described here.

The processor 130 controls overall operations of the LFD apparatus 100 using various programs stored in the storage 140.

Specifically, the processor 130 may include a Random Access Memory (RAM) 131, a Read Only Memory (ROM) 132, a main Central Processing Unit (CPU) 133, a graphic processor 134, first to n-th interfaces 135-1 to 135-$n$, and a bus 136.

The RAM 131, the ROM 132, the main CPU 133, the graphic processor 134, and the first to n-th interfaces 135-1 to 135-$n$ may be connected with one another via the bus 136.

The first to n-th interfaces 135-1 to 135-$n$ may be connected with the above-described various elements. One of the interfaces may be a network interface which is connected with an external device via a network.

The main CPU 133 may access the storage 140 and perform booting using the O/S stored in the storage 140. In addition, the main CPU 133 may perform various operations using various programs, etc. which are stored in the storage 140.

The ROM 132 may store a set of instructions for booting a system. In response to a turn on command being inputted and power being supplied, the main CPU 133 may copy the O/S stored in the storage 140 into the RAM 131 according to a command stored in the ROM 132, and boot the system by executing the O/S. In response to the booting being completed, the main CPU 133 may copy various application programs stored in the storage 140 into the RAM 131, and perform various operations by executing the application programs copied into the RAM 131.

The graphic processor 134 may generate a screen including various objects such as an icon, an image, a text, etc. using a calculator (not shown) and a renderer (not shown). The calculator may calculate attribute values of objects to be displayed according to a layout of the screen, such as a coordinate value, a shape, a size, a color, etc., based on a received control command. The renderer may generate a screen of various layouts including objects based on the attribute values calculated by the calculator. The screen generated in the renderer is displayed within a display area of the display 110.

The above-described operations of the processor 130 may be performed by a program stored in the storage 140.

The storage 140 may store various data such as an O/S software module for driving the LFD apparatus 100, various contents and content element information, a variety of control information, etc.

In this case, the processor 130 may control the display 110 to display a content including at least one content element based on information stored in the storage 140.

The communicator 150 may communicate with an external device according to various kinds of communication methods.

The communicator 150 may include various communication chips such as a Wi-Fi chip 151, a Bluetooth chip 152, a wireless communication chip 153, etc. The Wi-Fi chip 151 and the Bluetooth chip 152 may communicate in the Wi-Fi method and the Bluetooth method, respectively. The wireless communication chip 153 refers to a chip which performs communication according to various communication standards such as IEEE, Zigbee, 3rd Generation (3G), 3rd Generation Partnership Project (3GPP), Long Term Evolution (LTE), etc.

The communicator 150 may perform unidirectional communication or bidirectional communication with an electronic device. When the communicator 150 performs the unidirectional communication, the communicator 150 may receive signals from the electronic device. When the communicator 150 performs the bidirectional communication, the communicator 150 may receive signals from the electronic device or transmit signals to the electronic device.

The user interface 155 may receive various user interactions. The user interface 155 may be implemented in various forms according to an implementation of the LFD apparatus 100. For example, if the LFD apparatus 100 is implemented using a digital TV, the user interface 155 may be implemented using a remote control receiver for receiving a remote control signal from a remote control device, a camera for sensing a user motion, a microphone for receiving a user voice, etc. In addition, if the LFD apparatus 100 is implemented using a touch-based electronic device, the user interface 155 may be implemented in the form of a touch screen forming a mutual layer structure with a touch pad. In this case, the user interface 155 may also function as the display 110.

The audio processor 160 is an element for processing audio data. The audio processor 160 may perform various processing operations such as decoding, amplification, noise filtering, etc. with respect to the audio data.

The video processor 170 is an element for processing video data. The video processor 170 may perform various image processing operations such as decoding, scaling, noise filtering, frame rate conversion, resolution conversion, etc. with respect to the video data.

The speaker 180 is an element for outputting not only various audio data processed by the audio processor 160 but also various notification sounds, voice messages, etc.

The button 181 may include various types of buttons such as a mechanical button, a touch pad, a wheel, etc. formed on a certain area of the LFD apparatus 100, such as a front surface, a side surface, and a rear surface of the body exterior of the LFD apparatus 100.

The microphone 182 is an element for receiving an input of a user voice or other sounds and converting the user voice or sound into audio data.

Figure 3:
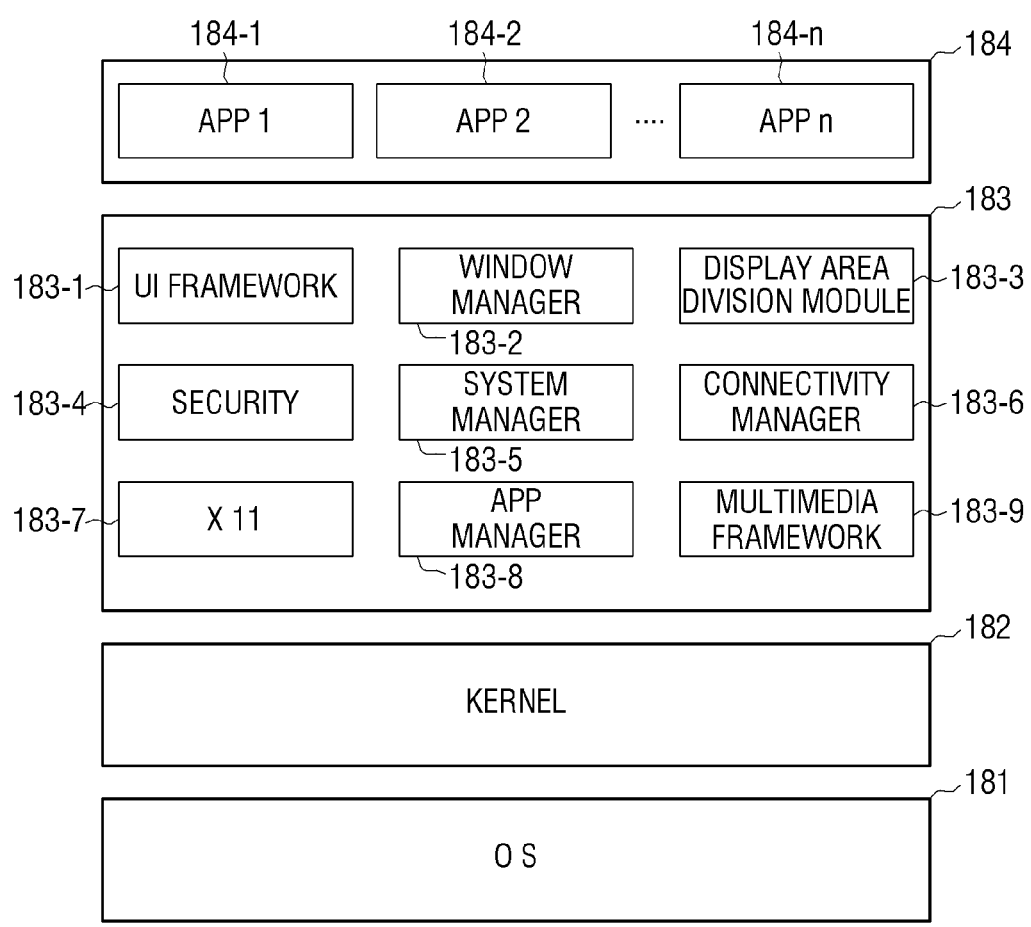
FIG. 3 is a block diagram showing a software stack of the LFD apparatus according to an exemplary embodiment.

FIG. 3 is a block diagram showing a software stack of the LFD apparatus 100 according to an exemplary embodiment.

The software of FIG. 3 may be stored in the storage 140, but a storing place is not limited thereto and the software may be stored in various kinds of storing means used by the LFD apparatus 100. For example, the software may be stored in an external memory or an external server. The software may include, but is not limited to, an Operating System (OS) 181, a kernel 182, middleware 183, an application 184, etc.

The OS 181 may control and manage overall operations of hardware. That is, the OS 181 is a layer which is responsible for basic functions such as hardware management, memory management, security maintenance, etc.

The kernel 182 may serve as a channel to transmit various signals between the OS and the middleware 183.

The middleware 183 may include various software modules to control the operations of the LFD apparatus 100. For example, as shown in FIG. 3, the middleware 183 may include a User Interface (UI) framework 183-1, a window manager 183-2, a display area division module 183-3, a security module 183-4, a system manager 183-5, a connectivity manager 183-6, an X11 module 183-7, an Application (APP) manager 183-8, and a multimedia framework 183-9.

The UI framework 183-1 may provide various UIs. The UI framework 183-1 may include an image compositor module to configure various objects, a coordinates compositor module to calculate coordinates for displaying the objects, a rendering module to render the configured objects on the calculated coordinates, a 2D/3D UI toolkit to provide a tool for configuring a UI in 2D or 3D form.

The window manager 183-2 may detect a control signal which is transmitted from a remote control device, a user touch input on the display 110, and various input events such as manipulation of a button provided on the LFD apparatus 100. In response to such an event being detected, the window manager 183-2 transmits an event signal to the UI framework 183-1 such that an operation corresponding to the event is performed. Specifically, in response to an event in which the user touches a certain area of the display 110 occurring, the UI framework 183-1 notifies the event. The UI framework 183-1 may change a display location of a content element based on a user's touch area, and display the content element.

The display area division module 183-3 may divide the screen of the display 110 into a plurality of areas according to at least one of a user's field of view and ease of user's operation based on user's height information as described above.

The security module 183-4 may support certification, permission, secure storage for hardware, software, an application, and a user. The security module 183-4 may change a display characteristic of a content element for inputting certification information, which is necessary for an application, based on user information (for example, height information). For example, an input window of an application for inputting a user's name, order number, password, etc. may be displayed on a different location according to a user's height. In addition, the security module 183-4 may perform a security function by changing display characteristics such as brightness, a direction of view, color, etc.

The system manager 183-5 may monitor the status of the elements in the LFD apparatus 100, and provides the result of the monitoring to other modules. For example, upon detecting that a battery life level is low, that an error occurs, or that communication is disconnected, the system manager 183-5 may provide the result of the monitoring to the UI framework 183-1 to output a notification message or a notification sound.

The connectivity manager 183-6 may support wire or/and wireless network connection. The connectivity manager 183-6 may include various sub modules such as a DNET module, a Universal Plug and Play (UPnP) module, and the like.

The X11 module 183-7 may receive various event signals from a variety of hardware provided in the LFD apparatus 100. The event may indicate, for example, that a user operation is detected, that a system alarm is generated, that a specific program is executed or ends, or the like.

The APP manager 183-8 may manage the execution states of various applications installed in the LFD apparatus 100. In response to the X11 module 183-7 detecting an event in which an application execution command is inputted, the APP manager 183-8 may call and execute an application corresponding to the event. That is, in response to an event in which at least one object is selected, the APP manager 183-8 may call an application corresponding to the object and execute the application.

The multimedia framework 183-9 may reproduce multimedia contents which are stored in the LFD apparatus 100 or provided from external sources. The multimedia framework 183-9 may include one or more sub-modules for efficiently processing the multimedia contents. The sub-modules may include, but are not limited to, a player module, a camcorder module, a sound processing module, and the like. Also, the multimedia framework 183-9 may generate various multimedia contents, e.g., a screen and a sound, which are to be reproduced by the LFD apparatus 100.

The software structure shown in FIG. 3 is merely an example and some of the elements may be omitted or changed, and one or more elements may be added when necessary. For example, the storage 140 may be additionally provided with various programs such as a sensing module to analyze signals sensed by various sensors, a messaging module such as a messenger program, a Short Message Service (SMS) & Multimedia Message Service (MMS) program, and an email program, a call information aggregator program module, a VoIP module, a web browser module, and the like.

Figure 4A:
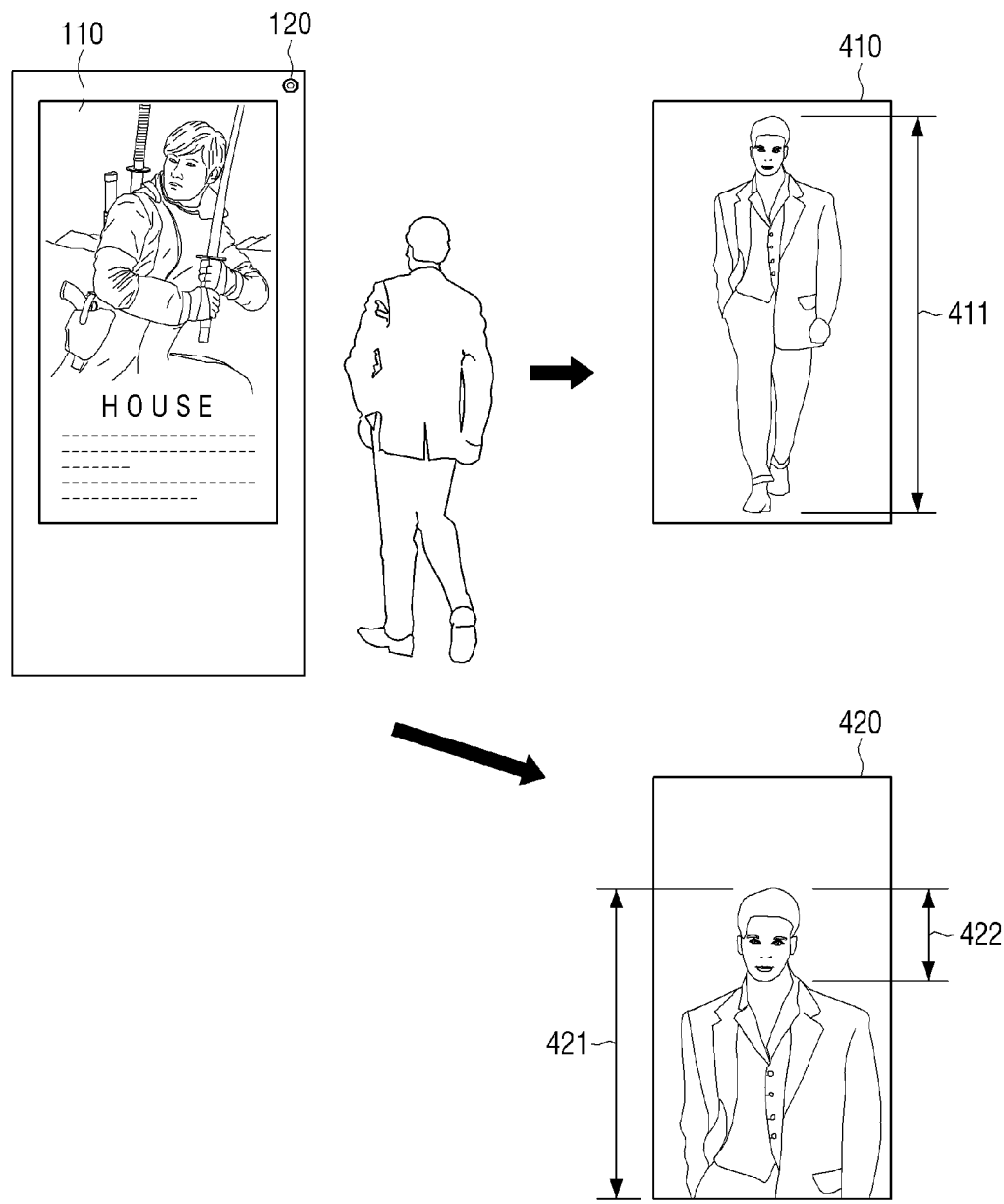
FIGS. 4A and 4B illustrate a method for estimating user's height according to an exemplary embodiment.
Figure 4B:
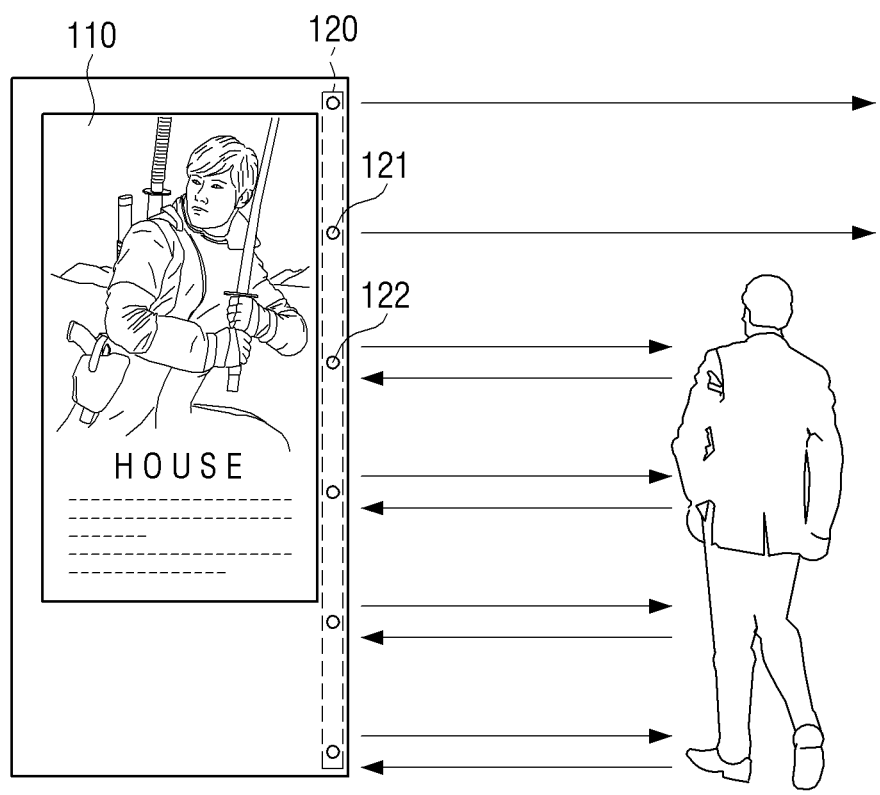

FIGS. 4A and 4B illustrate a method for estimating user's height according to an exemplary embodiment.

Referring to FIG. 4A, the sensor 120 may include a camera and the processor 130 may estimate user's height based on a user image which is photographed by the camera. For example, when the user is photographed from head to foot in the image 410 photographed by the camera, the processor 130 may estimate the user's height according to the length 411 of the user image occupying the photographed image 410. On the other hand, when only a part of the user is photographed in the image 420 photographed by the user, the processor 130 may estimate the user's height based on the area, e.g., a length 421, of the user image occupying the photographed image and the size, e.g., a length 422 of user's face.

A mechanism to estimate user's height is not limited to specific one. For example, the processor 130 may detect a user's face using the sensor 120 and estimate the user's height based on the location of the user's face in the photographed image. In detail, the processor 130 may detect a user's face, determine a distance between the user and the LFD apparatus 100 based on the size of the user's face, and estimate the user's height according to the location of the user's face in the photographed image based on the determined distance.

In an exemplary embodiment, the processor 130 may estimate the user's height based on a length between user's eyebrows or a silhouette from the photographed image.

In an exemplary embodiment, the processor 130 may estimate the user's height by extracting the size of a subject by projecting a normalized bottom pattern.

In an exemplary embodiment, the processor 130 may estimate the user's height by appropriately adjusting the photographed image according to the location of the camera in the LFD apparatus 100. For example, when the camera is located on the upper end of the LFD apparatus 100 and thus photographs the user from a higher position than the user's height, the processor 130 may consider a photographing angle to estimate the user's height.

Statistical information on the distance between the user and the LFD apparatus 100, which is determined according to the size of the user's face, and Statistical information on the user's height information, which is determined according to the location of the user's face in the photographed image and the determined distance, may be stored in the storage 140. The storage 140 may store a variety of information for estimating the user's height information in addition to the statistical information.

Referring to FIG. 4B, the sensor 120 may include a plurality of infrared sensors, and the processor 130 may acquire the user's height information based on the infrared waves detected by the plurality of infrared sensors. For example, the LFD apparatus 100 may include a plurality of infrared sensors arranged along the edge thereof, and the processor 130 may detect the presence of a user in response to the infrared waves detected by the infrared sensors.

Referring to FIG. 4B, two infrared sensors located on the top may not detect infrared waves reflected by the user and the other infrared sensors may detect reflected waves. Accordingly, the processor 130 may determine that the user is taller than the third infrared sensor 122 from the top and is smaller than the second infrared sensor 121 from the top. In an exemplary embodiment, more than six infrared sensors may be used to obtain a more accurate estimate.

In an exemplary embodiment, the infrared sensors may detect infrared waves radiating from the user, which is not reflection. In this case, the user's height may be estimated based on a signal strength detected by each infrared sensor.

As aforementioned, the sensor 120 may be implemented using various types of sensors. For example, a Kinect, a depth camera, an ultrasonic sensor, etc. may be used. When the Kinect is used, the lengths of upper body and lower body may be detected based on user's joint points, and accordingly, the user's height information may be acquired. When the depth camera is used, the user's height information may be acquired by generating a user's disparity map and comparing the disparity map with a standard body model. When the ultrasonic sensor is used, the user may be scanned by the ultrasonic sensor, and the user's height information may be acquired based on the scanned information.

In addition, the LFD apparatus 100 may acquire user information, e.g., height information, by communicating with an electronic device carried by the user. In this case, the LFD apparatus 100 may communicate with the electronic device carried by the user using a wireless communication protocol, such as Wi-Fi, Near Field Communication (NFC), etc.

In an exemplary embodiment, the LFD apparatus 100 may acquire the user's height information using a contact sensor in addition to the above-described non-contact sensors. As aforementioned, a type of sensor for implementing the sensor 120 is not limited to a specific one.

Figure 5A:
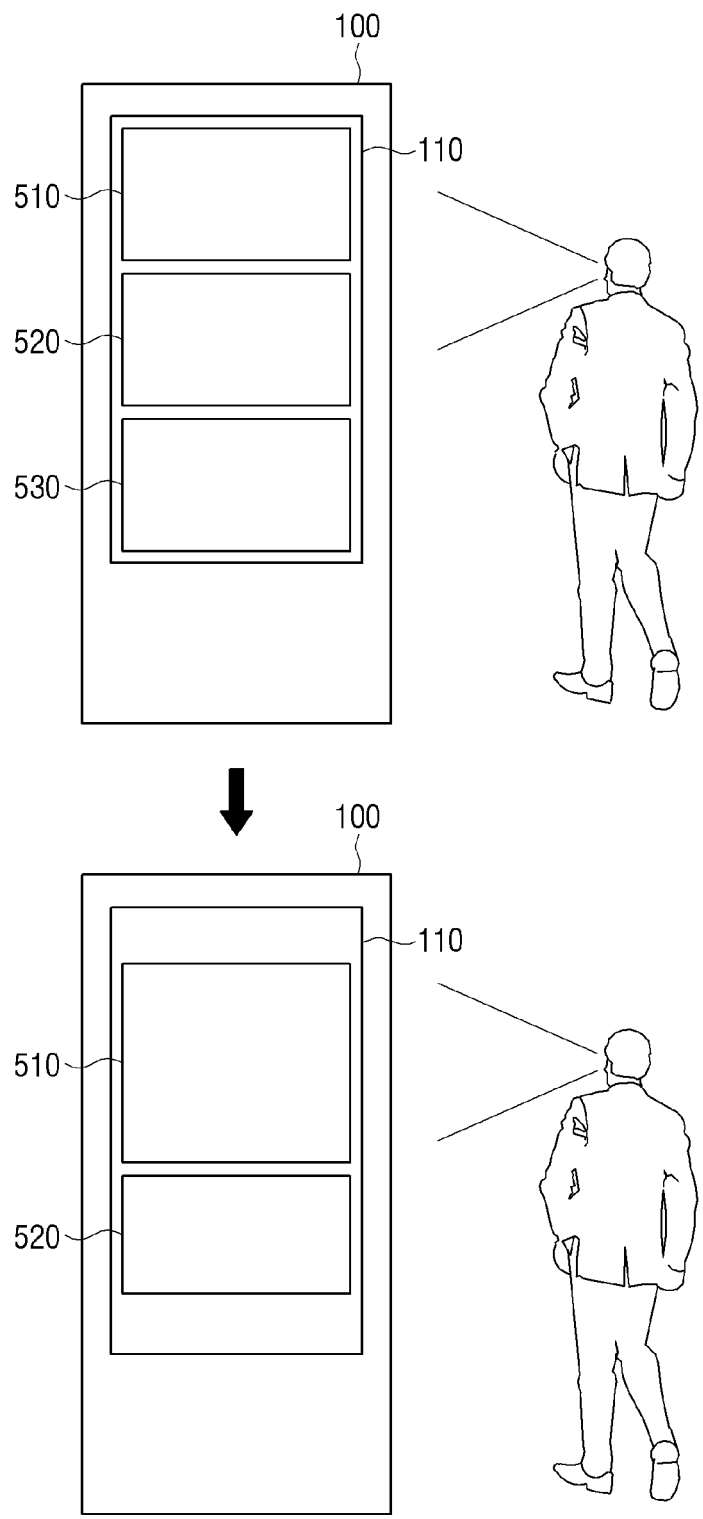
FIGS. 5A and 5B illustrate a method for displaying a content element based on user's height according to an exemplary embodiment.
Figure 5B:
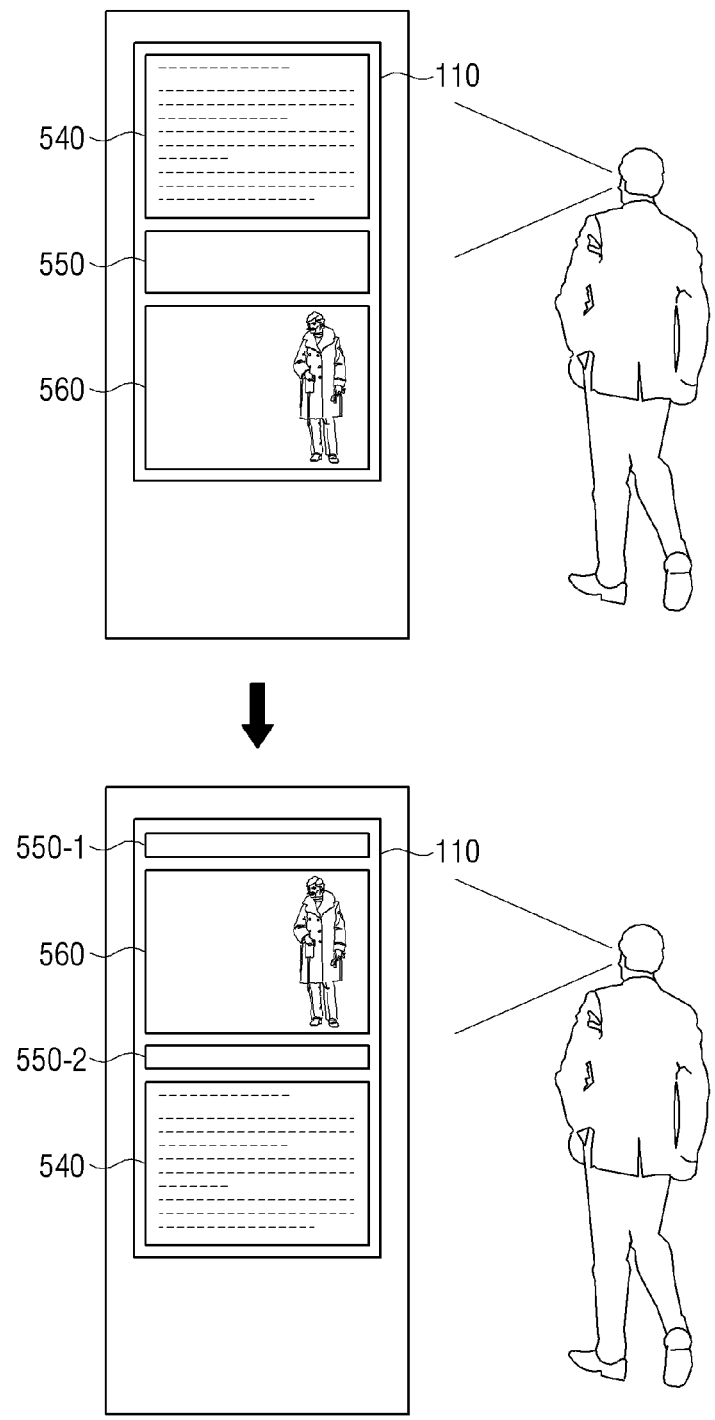

FIGS. 5A and 5B illustrate a method for displaying a content element based on user's height according to an exemplary embodiment.

Referring to FIG. 5A, the processor 130 may adjust a layout of the screen of the LFD apparatus 100 according to a user's field of view which is estimated based on the user's height information.

For example, the processor 130 may initially divide the screen into a first area 510, a second area 520, and a third area 530 of the same size before a user is detected. It is assumed that the first area 510 provides the user with the most comfortable view of the display 110. Further, the user may view the second area 520 not so comfortably as the first area 510, but the second area 520 may enter the user's field of view if the user slightly changes a posture. The third area 530 is not seen from the user's point of view, or displays no contents.

After acquiring from the sensor 130 or generating the user's height information, the processor 130 may divide the screen differently. Specifically, the first area 510 may be expanded as shown in the lower view of FIG. 5A, thereby fully fitting the first area 510 in the user's field of view. In addition, the processor 130 may set the second area 520 under the first area 510.

The content displayed on the display 110 may include a first content element and a second content element, and the processor 130 may display the first and second content elements on a plurality of display areas according to a priority order of the first and second content elements. For example, when the first content element has a higher priority than the second content element, the processor 130 may display the first content element on the first area 510, and display the second content element on the second area 520.

In an exemplary embodiment, the priority order may be predetermined before the content is processed by the LFD apparatus 100. Alternatively, the priority order may be determined by the LFD apparatus 100. For example, the processor 130 may determine the priority order of the content elements based on a type of content, which will be explained in detail below with reference to FIG. 5B.

In FIG. 5A, the display screen is divided into the plurality of display areas, and then the content elements are assigned to the display areas based on the priority order of the content elements. However, this should not be considered as limiting a displaying method of the content elements, and the display areas of the content elements may be determined in a different manner. For example, the display areas of the content elements may be determined further considering a content type.

As shown in the upper view of FIG. 5B, the display 110 may display an advertisement content including a plurality of content elements, such as an advertising phrase 540, a space 550, and an advertisement model photo 560. After recognizing the user and acquiring the user's height information, the processor 130 may change the display locations of the content elements on the display 110. In an exemplary embodiment, a priority order may indicate that an image should be considered the most important element in an advertisement content. As a result, the advertisement model photo 560 may be displayed on a location which provides the user with the most comfortable view, as shown in the lower view of FIG. 5B. The space 550 shown in the upper view may be divided into two spaces 550-1 and 550-2 in the lower view. The space 550-1 may be properly arranged to fit the advertisement model photo 560 in the user's field of view. In addition, the processor 130 may display the advertising phrase 540 on the bottom of the display 110 based on the priority order. The space 550-2 may be properly arranged between the advertisement model photo 560 and the advertising phrase 540 to separate the advertising phrase 540 and the advertisement model photo 560, thereby providing a comfortable view of the advertisement content. A size of the content elements 540, 560 may change when the display locations of the content elements 540, 560 are rearranged. For example, the advertisement model photo 560 may be expanded to fully fit in the user's field of view based on the user's height information.

Figure 6A:
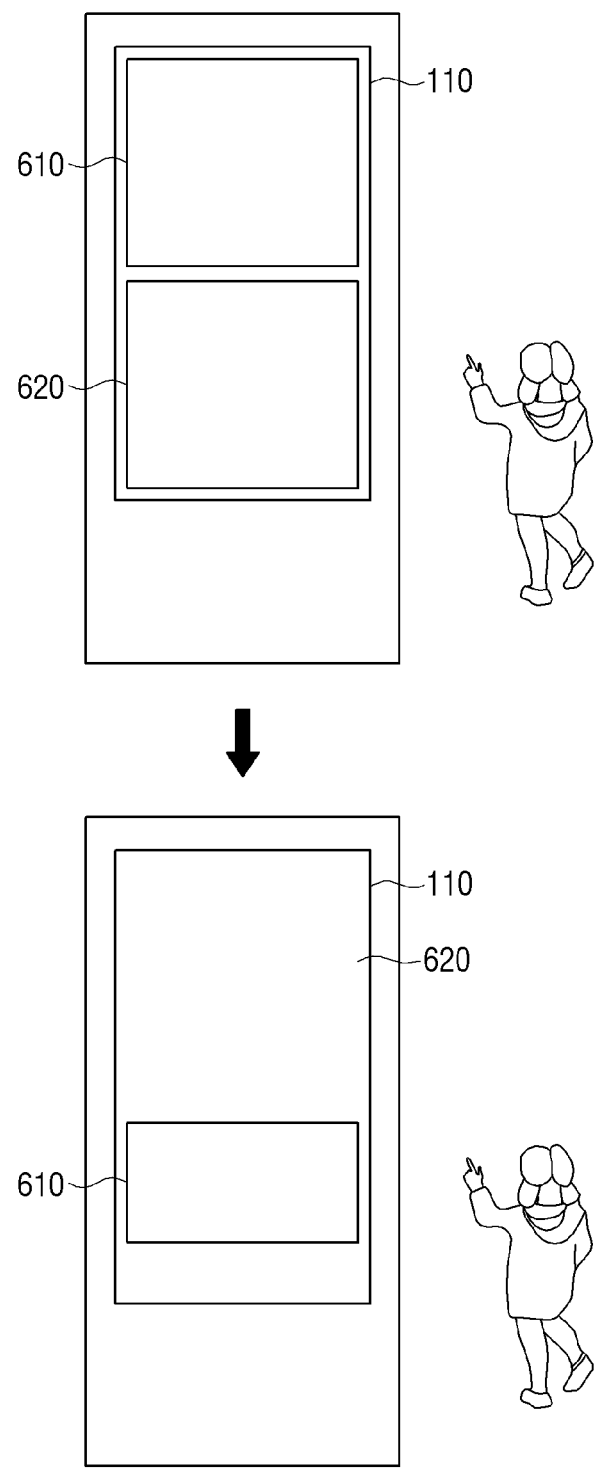
FIG. 6A illustrates a method for adjusting a touch recognizable display area according to an exemplary embodiment.

FIG. 6A illustrates a method for adjusting a touch recognizable display area according to an exemplary embodiment.

Referring to FIG. 6A, the processor 130 may divide the screen of the display 110 into a plurality of display areas for ease of user's touch operation based on user's height information. Initially, the processor 130 may divide the screen into a first display area 610 and a second display area 620 of the same size. The first display area 610 represents an area which may recognize a touch input and the second display area 620 represents an area which does not recognize a touch input.

After recognizing a user and acquiring user's height information, the processor 130 may adjust the first display area 610 and the second display area 620 to facilitate user's touch operation. For example, if a user is a little kid, the first display area 610 may be arranged as shown in the lower view of FIG. 6A such that the kid may easily touch the first display area.

In addition, the processor 130 may set the other area as the second display area 620 which does not respond to a touch input. The processor 130 may be configured to ignore a touch input on the second display area 620. Alternatively, power may not be supplied to the second display area of a touch panel.

Figure 6B:
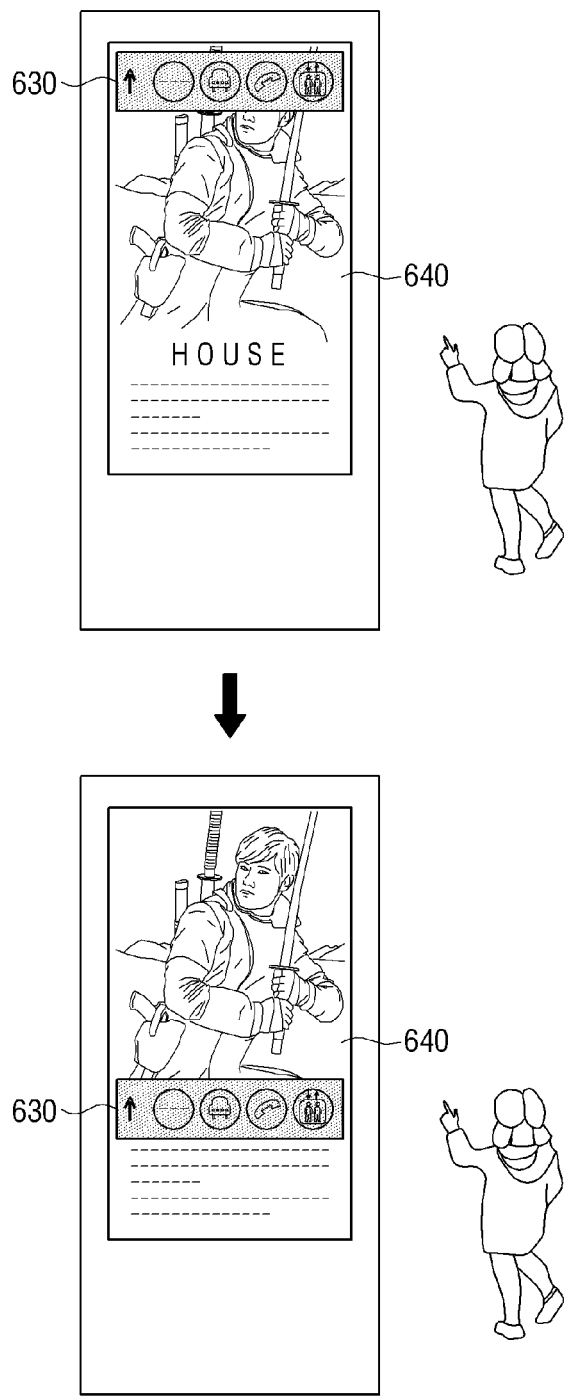
FIG. 6B illustrates a method for adjusting a display location of at least one content element which requires a user's touch input, according to an exemplary embodiment.

FIG. 6B illustrates a method for adjusting a display location of at least one content element which requires a user's touch input, according to an exemplary embodiment.

Referring to FIG. 6B, the processor 130 may adjust a display location of a content element which requires a user's touch operation based on the user's height information for ease of use. For example, a content element 630 which requires a user's touch operation is initially displayed on the top of the screen as shown in the upper view of FIG. 6B. After recognizing a user and acquiring user's height information, the processor 130 may shift the content element 630 which requires the user's touch operation to the bottom of the screen as shown in the lower view of FIG. 6B.

As shown FIG. 6B, the content element 630 which requires the user's touch operation may overlap another content element 640 which is displayed in the background. Alternatively, the content elements may be arranged such that there is no overlapping. For example, the processor 130 may also shift other content elements so that there is no content elements overlapping each other.

The display areas of FIGS. 5A and 5B may be independent of the touch recognizable display areas of FIGS. 6A and 6B. Thus, the display areas of FIGS. 5A and 5B, and the touch recognizable display areas of FIGS. 6A and 6B may overlap each other. For example, a part of the first area 510 of FIGS. 5A and 5B may overlap the first display area 610 of FIGS. 6A and 6B.

In addition, the processor 130 may arrange the display areas on account of both the user's field of view and the ease of the user's touch operation. For example, in response to a user's touch being inputted or the user approaching within a predetermined distance, the processor 130 may set or change the first area 510 based on a received touch input or a touch recognizable area. After the first area 510 is set, the processor 130 may adjust a display characteristic of the first area 510 based on the user's touch input. For example, the processor 130 may change a size, a brightness, view settings, etc. of the first area 510 to secure user's privacy.

Figure 7:
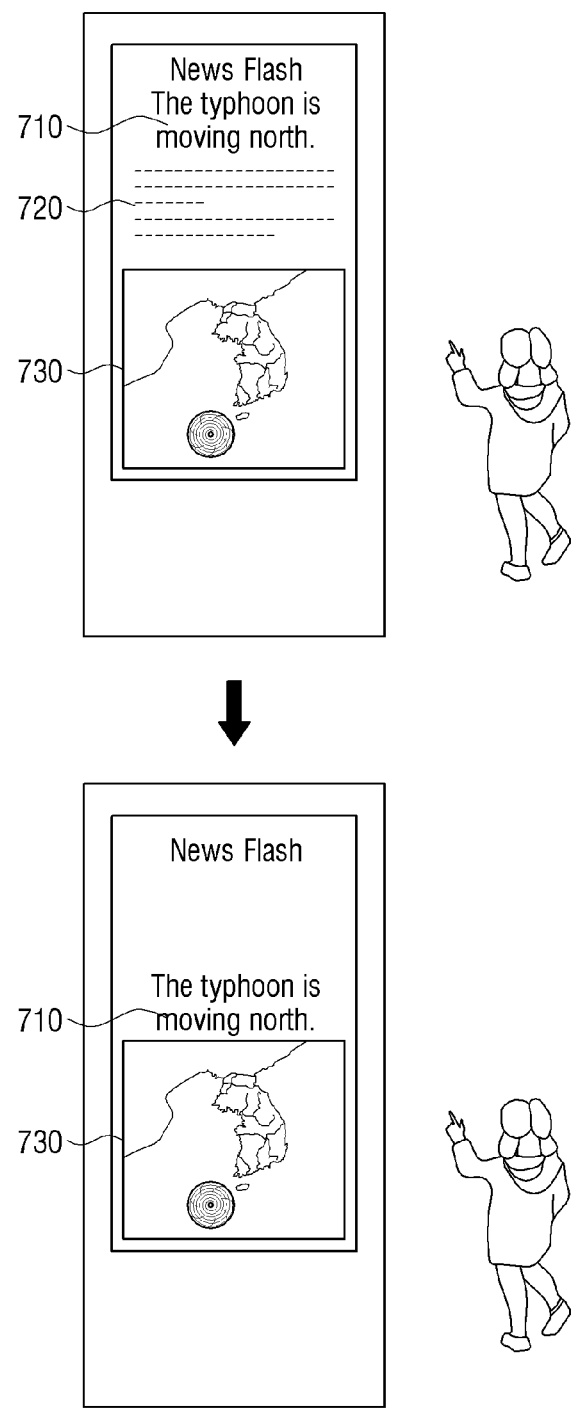
FIG. 7 illustrate a method for determining a priority order of content elements based on a type of content according to an exemplary embodiment.

FIG. 7 illustrate a method for determining a priority order of content elements based on a type of content according to an exemplary embodiment.

Referring to FIG. 7, the processor 130 may determine a priority order of content elements included in a content based on a type of the content, and determine a display location of the content elements based on user's height information and the priority order.

For example, if the type of content is a news flash, the processor 130 may determine a title 710 of the news to be the most important content element, determine a news image 730 to be the next important content element, and determine a news content 720 to be the least important element after the news image 730. In addition, in response to detecting a small user, e.g., a child, the processor 130 may display the title 710 of the news on a location which best fit the field of view of the child, and display the news image 730 under the title 710. The processor 130 may delete the news content 720 considering that the user is a child. Alternatively, the processor 130 may shift the news content 720 to other location on the screen.

The processor 130 may determine the priority order in a different manner according to a type of content. In addition, the priority order may be determined based on user's height information as well as the type of content. For example, in response to a child being detected, the processor 130 may determine the news image 710 to be the most important content element.

Figure 8:
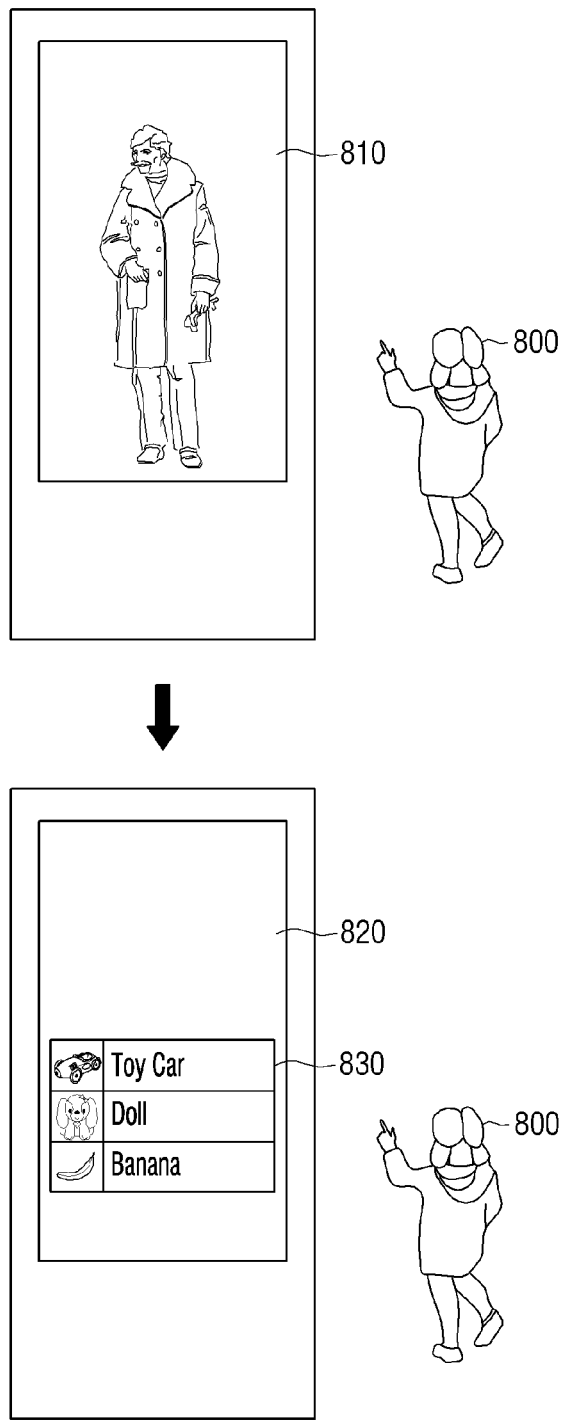
FIG. 8 illustrates a method for changing a content based on user's height according to an exemplary embodiment.

FIG. 8 illustrates a method for changing a content based on user's height according to an exemplary embodiment.

The processor 130 may change a content or/and at least one content element based on user's height information. For example, the processor 130 may change a display form, e.g., a style, an expression format, etc., of at least one content element. Further, a display location of the changed content element may be also determined based on user's height information.

As aforementioned, user's age may be estimated based on the use's height information. As shown in FIG. 8, in response to a child being recognized based on user's height information while an advertisement 810 for men's clothing is being displayed, the processor 130 may change the content from the advertisement to other content related to children. For example, the changed content 820 may include content elements 830 about a toy car, a doll, and bananas, as shown in FIG. 8. In addition, the processor 130 may change the expression format of the content element from a photo to a cartoon. In an exemplary embodiment, the processor 130 may change a person in a displayed advertisement to a cartoon character.

In addition, the processor 130 may estimate a location of a user's face or/and a user's age based on the user's height information, and change the display location of at least one content element accordingly.

In FIG. 8, all of the content elements are changed. However, only some of the content elements may be changed in other exemplary embodiment. For example, in response to a child being detected while map information is being displayed, the processor 130 may overlap a phrase "Turn left to reach a stationary store!" the map information for the child.

Figure 9:
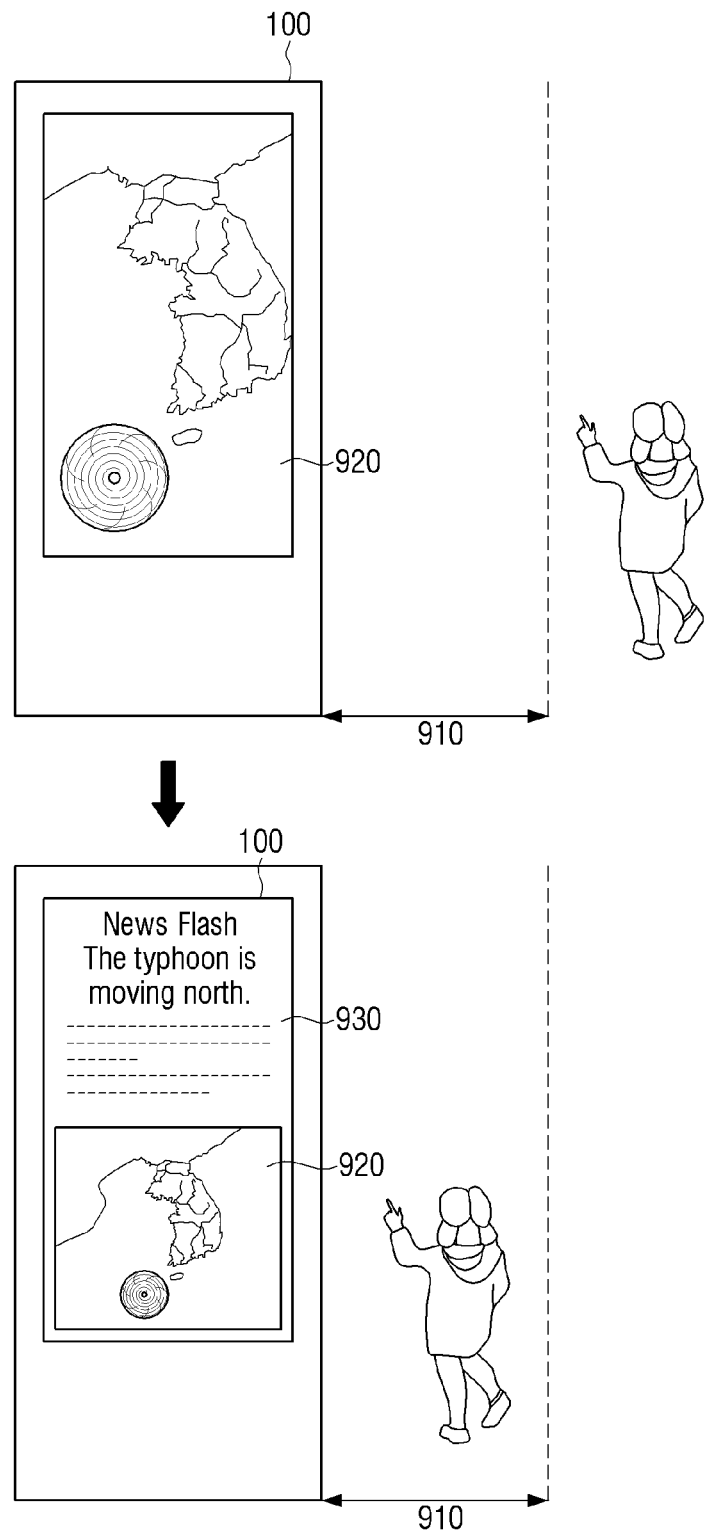
FIG. 9 illustrates a method for displaying content elements based on additional information acquired from user's height information, according to an exemplary embodiment.

FIG. 9 illustrates a method for displaying content elements based on additional information acquired from user's height information, according to an exemplary embodiment.

Referring to FIG. 9, the processor 130 may estimate a distance between the user and the LFD apparatus 100 from the user's height information, and change a type or/and a display location of content elements according to the estimated distance. For example, if there is no user detected within a predetermined distance 910 from the LFD apparatus 100, the processor 130 may display a content element including only images 920 as shown in the upper view of FIG. 9. If a user is detected within a predetermined distance 910 from the LFD apparatus 100, the processor 130 may display a content element including texts 930 in addition to the images 920 as shown in the lower view of FIG. 9.

In an exemplary embodiment, if there is no user detected within a predetermined distance from the LFD apparatus 100, the processor 130 may display a text as well as an image. If a user is detected within a predetermined distance from the LFD apparatus 100, the processor 130 may reduce the displayed image, and instead magnify some or all of the displayed texts.

The processor 130 may gradually change a type or/and a display location of the content elements according to distance information indicating an estimated distance between the user and the LFD apparatus 100. For example, the processor 130 may detect the user in real time and may gradually reduce the image and magnify the text as the user approaches step by step. Alternatively, the processor 130 may change the type of the content element or/and the display location instantaneously in response to detecting the user within a predetermined distance.

In addition, the processor 130 may display the content elements in a different manner based on a direction and a speed of a user's movement. For example, in response to the user approaching the LFD apparatus 100, the processor 130 may reduce the image and magnify the text. On the other hand, in response to the user receding from the LFD apparatus 100, the processor 130 may magnify the image and reduce the text. In addition, in response to the user moving fast, the processor 130 may magnify or reduce the content elements correspondingly fast.

As aforementioned, the distance may be estimated based on user's height information and used as a key factor to properly display one or more content elements. However, this should not be considered as limiting and user information which may be estimated based on user's height information may include, but is not limited to, a height, a viewing angle, a sex, an age, walking pace, a motion direction, a distance between the user and the LFD apparatus 100, etc. The processor 130 may display the content elements based on the estimated user information.

For example, the processor 130 may determine a type of a content element, which may include, but is not limited to, a moving image, a sound, a text, and an image.

Also, the processor 130 may change magnification, reduction, resolution, brightness, color, a motion direction, a speed, and view settings regarding the content elements as well as a type or/and a display location of the content elements.

Figure 10:
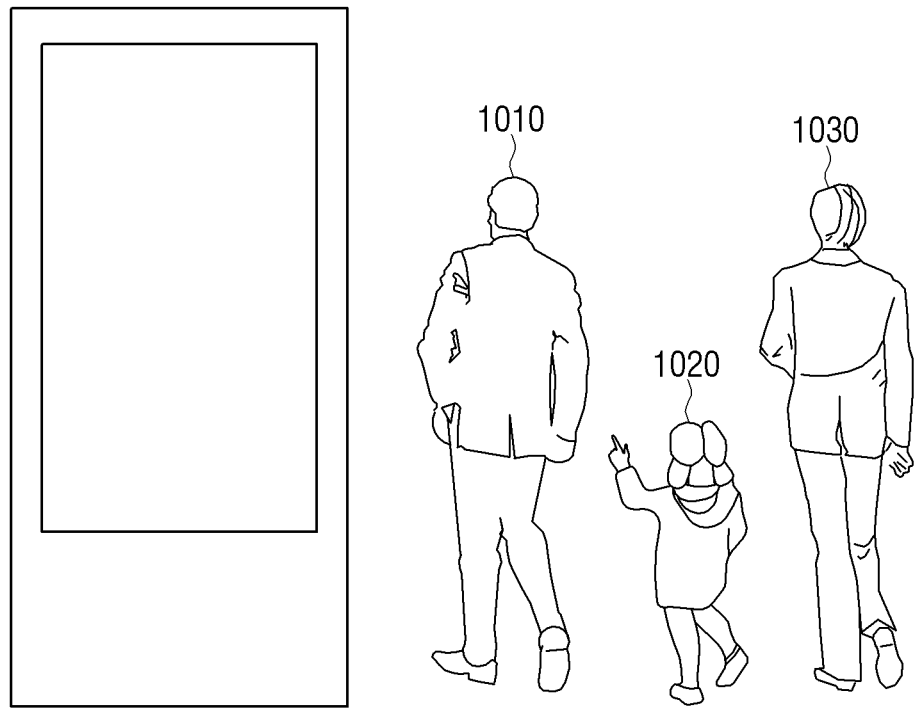
FIG. 10 illustrates an operation of an LFD apparatus when a plurality of users are detected, according to an exemplary embodiment.

FIG. 10 illustrates an operation of the LFD apparatus when a plurality of users are detected, according to an exemplary embodiment.

Referring to FIG. 10, in response to a plurality of users being detected through the sensor 120, the processor 130 may change a display location of at least one content element based on height information of the closest user to the LFD apparatus 100 among the users or/and average height information of the users may be considered. For example, the processor 130 may change the display location of at least one content element based on height information of the closest user 1010. Alternatively, the processor 130 may change the display location of at least one content element based on average height information of the users 1010, 1020, 1030.

In an exemplary embodiment, the processor 130 may consider only some users existing within a predetermined distance among the detected users, when calculating the average height information.

In addition, the processor 130 may exclude some users from consideration based on a type of content when calculating the average height information. For example, when the LFD apparatus 100 is displaying an advertisement for adult clothes, the processor 130 may disregard the height information of a child and change the display location of at least one content element.

The processor 130 may provide a same content element to the plurality of users when a small number of content elements are included in the content and fewer than a predetermined number of users exist. For example, if thirty users are detected, the processor 130 may display at least one content element based on height information of the closest user or/and average height information of the users, and may not provide the same content element to all of the plurality of users.

The processor 130 may estimate an arm's length based on user's height information, and may change the display location of at least one content element based on the estimated arm's length. In addition, the processor 130 may change terms included in the content according to a user's age.

Figure 11:
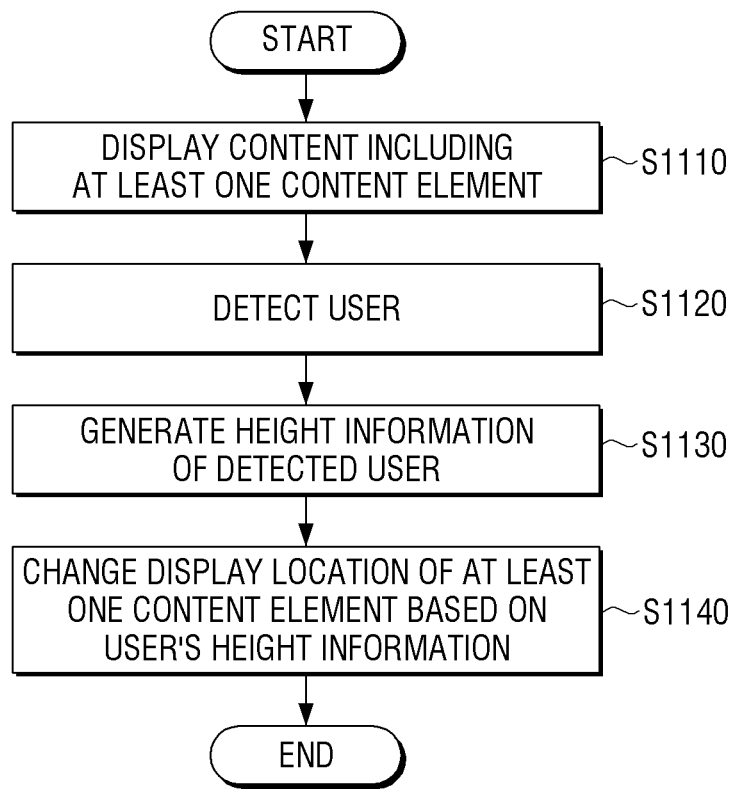
FIG. 11 is a flowchart to illustrate a control method of an LFD apparatus according to an exemplary embodiment.

FIG. 11 is a flowchart which illustrates a control method performed by an LFD apparatus for displaying content according to an exemplary embodiment.

At operation S1110, a content including at least one content element may be displayed.

At operation S1120, a user's presence may be detected.

At operation S1130, height information of the detected user may be generated directly from the sensor 120 or generated by the processor 130 based on information received the sensor 120. For example, the user's height information may be acquired based on a user image which is photographed by a camera.

At operation S1140, the display location of the at least one content element is changed based on the user's height information.

The control method may further include dividing a screen of the LFD apparatus into a plurality of display areas according to a user's field of view based on the user's height information.

If the content includes a first content element and a second content element, the first and second content elements may be displayed on corresponding display areas of the plurality of display areas based on the priority order of the first and second content elements.

The control method may further include dividing the screen of the display into a plurality of display areas for ease of user's touch operation based on the user's height information.

In operation S1140, a content element which requires a user's touch operation may be displayed on at least one of a plurality of display areas for ease of user's touch operation based on the user's height information.

The control method may further include determining a priority order of at least one content element based on a type of content, and, in operation S1140, the display location of the at least one content element may be changed based on the user's height information and the priority order.

In operation S1140, at least one of a content and at least one content element may be changed based on user's height information. For example, a display form, e.g., a style, an expression format, etc., of at least one content element may be changed based on user's height information.

In operation S1140, at least one of a location of user's face and a user's age may be estimated based on user's height information, and the display location of the at least one content element may be changed based on the estimated information.

In operation S1140, in response to a plurality of users being detected, the display location of at least one content element may be changed based on at least one of height information of a closest user to the LFD apparatus among the users, and average height information of the plurality of users.

The LFD apparatus may display content elements included in a content based on a user to provide a comfortable view and enable the user to easily touch the screen. As a result, user's convenience can be enhanced.

The LFD apparatus 100 may be provided with a touch panel to receive a touch input. In an exemplary embodiment, the LFD apparatus 100 may detect a motion without a direct touch on the display 110, and perform a corresponding operation.

The processor 130 may acquire user's height information and divide the screen of the display 110 into a plurality of display areas or touch areas based on the user's height information. In response to a user's touch being inputted while a content element is being displayed after the screen is divided into the plurality of display areas as described above, the processor 130 may reset the display areas or/and the touch areas based on the user's touch input.

The processor 130 may store user information acquired by the LFD apparatus 100. For example, the processor 130 may store user's height information, a touch point, etc. detected by the LFD apparatus 100, and, in response to the same user being recognized again afterward, may display the content element based on the stored information.

In an exemplary embodiment, a single large display is used for the LFD apparatus 100. Alternatively, the LFD apparatus 100 may be implemented by connecting a plurality of displays like display walls. In an exemplary embodiment, if the LFD apparatus 100 is implemented by connecting the plurality of displays, the plurality of displays may be arranged to form a rectangular shape. However, this should not be considered as limiting the shape of the LFD apparatus. For example, the plurality of displays may be arranged to form a stepwise or pyramid shape.

The control method of the LFD apparatus according to an exemplary embodiment may be implemented as a program code which can be executed in a computer, and may be stored in various non-transitory computer readable media and provided to servers or devices to be executed by a processor.

For example, a non-transitory computer readable medium which stores a program performing the operations of: displaying a content including at least one content element; recognizing a user; acquiring height information of the recognized user; and changing a display location of the at least one element based on the acquired height information may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus comprising:
   a display;
   a sensor; and
   a processor configured to:
      control the display to display a first content element which requires a touch input and a second content element,
      estimate, in response to a user being sensed by the sensor, a height of the user based on information received from the sensor,
      change a display location of the first content element on a screen of the display based on the height of the user, and
      change a display location of the second content element on the screen based on the changed location of the first content element.

2. The display apparatus of claim 1, wherein the sensor comprises at least one camera, and
   wherein the processor is configured to estimate the height of the user based on at least one image of the user, the at least one image being photographed by the at least one camera.

3. The display apparatus of claim 2, wherein the processor is configured to determine a field of view of the user based on the estimated height and divide the screen into a plurality of display areas for displaying the first content element and the second content element according to the field of view of the user in response to the user being detected.

4. The display apparatus of claim 3, wherein the processor is configured to determine a size of one of the plurality of display areas to fully fit in the field of view of the user.

5. The display apparatus of claim 1, wherein the processor is configured to activate a touch recognition function on a first display area of the screen and inactivate the touch recognition function on a second display area of the screen, based on the estimated height.

6. The display apparatus of claim 5, wherein the processor is configured to display on the first display area of the screen the first content element.

7. The display apparatus of claim 1, wherein the processor is configured to change the first content element and the second content element based on the estimated height.

8. The display apparatus of claim 7, wherein the processor is configured to estimate an age of the user based on the estimated height, and determine the first content element and the second content element based on the estimated height and the estimated age.

9. The display apparatus of claim 1, wherein the processor is configured to estimate at least one of a location of a face of the user and an age of the user based on the estimated height, and change the display location of the first content element on the screen based on at least one of the location of the face of the user and the age of the user.

10. The display apparatus of claim 1, wherein the processor is configured to, in response to a plurality of users being detected using the sensor, change the display location of the first content element based on at least one of a height of a user who is located closest to the display apparatus among the plurality of users and average height of the plurality of users.

11. A control method of a display apparatus, the control method comprising:
    displaying a first content element which requires a touch input and a second content element;
    detecting a user using a sensor;
    estimating, in response to the user being detected by the sensor, a height of the user based on information received from the sensor;
    changing a display location of the first content element on a screen of the display apparatus based on the height of the user; and
    changing a display location of the second content element on the screen based on the changed location of the first content element.

12. The control method of claim 11, wherein the estimating comprises estimating the height of the user based on at least one image of the user, the at least one image being photographed by a camera.

13. The control method of claim 12, further comprising:
    determining a field of view of the user based on the estimated height; and
    dividing the screen into a plurality of display areas for displaying the first content element and the second content element according to the field of view of the user in response to the user being detected.

14. The control method of claim 11, further comprising:
    activating a touch recognition function on a first display area of the screen and inactivating the touch recognition function on a second display area of the screen, based on the estimated height.

15. The control method of claim 14, wherein the displaying comprises displaying on the first display area of the screen the first content element.

* * * * *